(12) United States Patent
Ellis et al.

(10) Patent No.: US 7,337,185 B2
(45) Date of Patent: Feb. 26, 2008

(54) SYSTEM AND METHOD FOR PROVIDING AN IMPROVED GRAPHICAL USER INTERFACE FOR SEARCH

(75) Inventors: Kevin Ellis, San Francisco, CA (US); Christina Wodtke, Palo Alto, CA (US); Jennifer Crakow, San Francisco, CA (US); Qi Lu, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 219 days.

(21) Appl. No.: 10/783,862

(22) Filed: Feb. 20, 2004
(Under 37 CFR 1.47)

(65) Prior Publication Data

US 2005/0050024 A1 Mar. 3, 2005

Related U.S. Application Data

(60) Provisional application No. 60/466,999, filed on Apr. 30, 2003.

(51) Int. Cl.
*G06F 17/30* (2006.01)
*G06F 15/16* (2006.01)

(52) U.S. Cl. ............... 707/102; 707/100; 707/200; 709/228

(58) Field of Classification Search .......... 707/1, 707/10, 100, 102, 200; 709/206, 219, 228; 705/1, 50; 715/513
See application file for complete search history.

(56) References Cited

U.S. PATENT DOCUMENTS

2002/0065671 A1* 5/2002 Goerz et al. ............ 705/1
2003/0061211 A1* 3/2003 Shultz et al. ............ 707/3

OTHER PUBLICATIONS

PCT International Search Report dated Dec. 8, 2004 for International Application No. PCT/US04/13418.

* cited by examiner

*Primary Examiner*—Tony Mahmoudi
(74) *Attorney, Agent, or Firm*—James J. DeCarlo; Greenberg Traurig, LLP (57) ABSTRACT

There is provided a system for visually associating a search region containing search criteria with a search category from which the results of a search are found. The system contains a search region containing a user's search criteria, a result region comprising indicia of several search categories, and a connection indicator establishing a visual connection between the search term contained in a search region and a selected one of search category indicia so as to enable a user to make a cognitive connection indicating that the user's search term was found in the particular search category indicated by the connection indicator.

30 Claims, 13 Drawing Sheets

SYSTEM AND METHOD FOR PROVIDING AN IMPROVED GRAPHICAL USER INTERFACE FOR SEARCH

CROSS-REFERENCE TO RELATED APPLICATIONS

This application claims priority to co-pending U.S. Provisional Application Ser. No. 60/466,999, filed Apr. 30, 2003, the entire disclosure of which is incorporated herein by reference.

FIELD OF THE INVENTION

The present invention relates generally to providing search results in response to search criteria entered by a user through a Graphical User Interface (GUI) and, more particularly, to a system and method for presenting a GUI that visually associates a search region containing search criteria with a search category.

BACKGROUND OF THE INVENTION

The Internet was initially developed to facilitate the electronic sharing of information between academic institutions and government organizations. The information available was limited and access to it was restricted to those companies and institutions that were directly connected to the network. While the information was available electronically, it was not easy to search and retrieve relevant documents. Eventually, programmers developed search engines to automate much of the search process. The search engine permits a user to input certain search criteria and obtain the appropriate documents without knowing where the documents are located.

Figure 1:
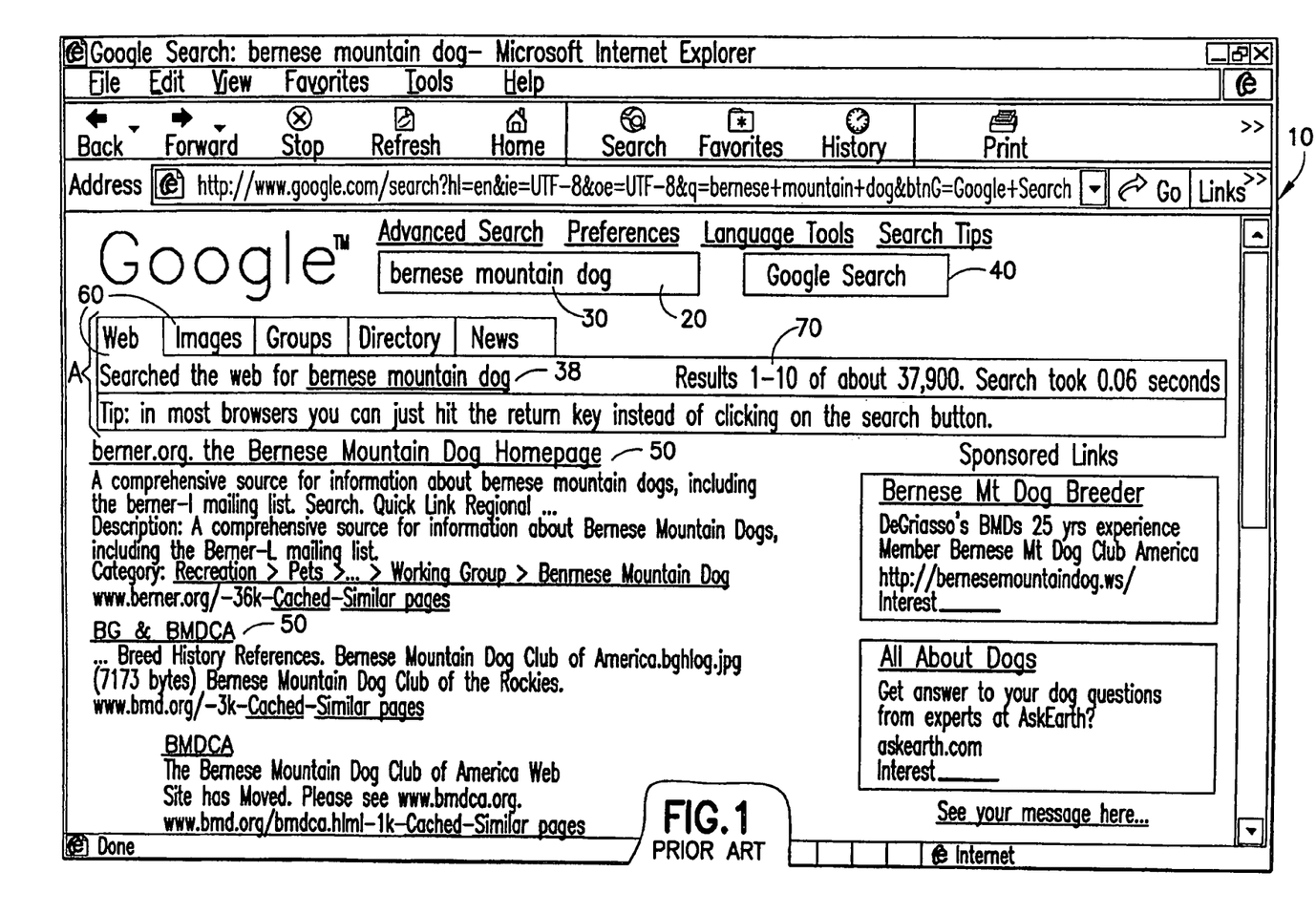
FIG. 1 is a screen shot of a search results screen, according to the prior art.

One such example of a search engine is disclosed in FIG. 1. FIG. 1 shows a GUI implemented search results screen 10 containing various information including a search field 20 wherein a user enters a search term 30. Once search term 30 is entered, the user depresses a search button 40 to begin the search. When the search is complete, the search engine returns a plurality of search results 50 corresponding to a plurality of search categories 60 that are generally hot links to the specific search category listed (e.g., News, Web, etc.). The user is free to select any one of the search categories 60 to display corresponding search results 50. The total number of hits (results) 70 is also displayed.

Currently, search engines textually display a confirmation of search criteria 38 for each of the search categories 60. This confirmation of search criteria 38 textually indicates what search term was used for each search category 60. Unfortunately, given the large amount of textual data present on a screen, i.e. both content and advertising, users may not associate the search criteria recitation 38 with the appropriate search category 60. In addition, the search criteria 38 separates the plurality of search results 50 from the search category 60.

Figure 2:
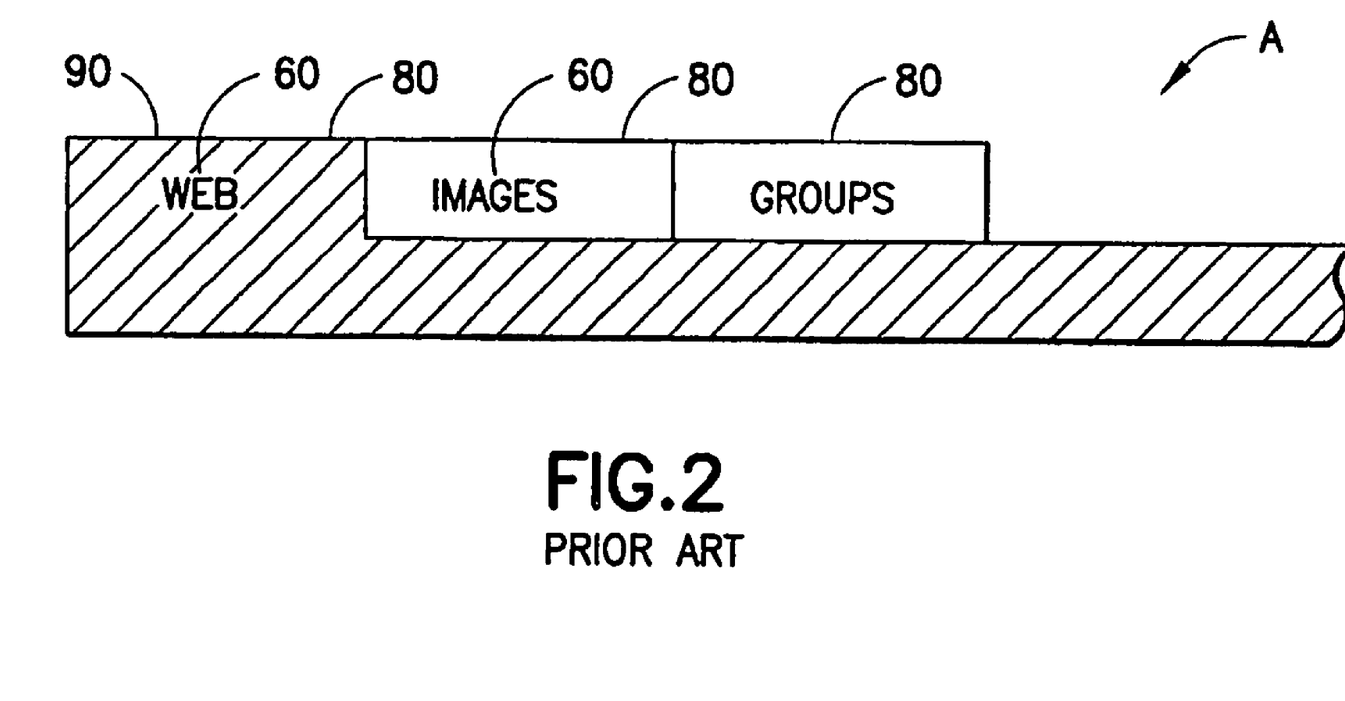
FIG. 2 is an enlargement of section "A" of FIG. 1.

Referring to FIG. 2, there is shown an enlargement of section "A" of FIG. 1. The search categories 60 are separated into a plurality of tabs 80 which resemble the index tabs on a standard paper file folder, wherein one of the tabs 80 is a selected tab 90. Selected tab 90 is highlighted to reflect that search results 50 correspond to the search category 60 selected by the user, (e.g., in the example shown, the WorldWideWeb, or the "Web"). However, the search criteria 38 separate the plurality of search results 50 from the search category 60.

Figure 3:
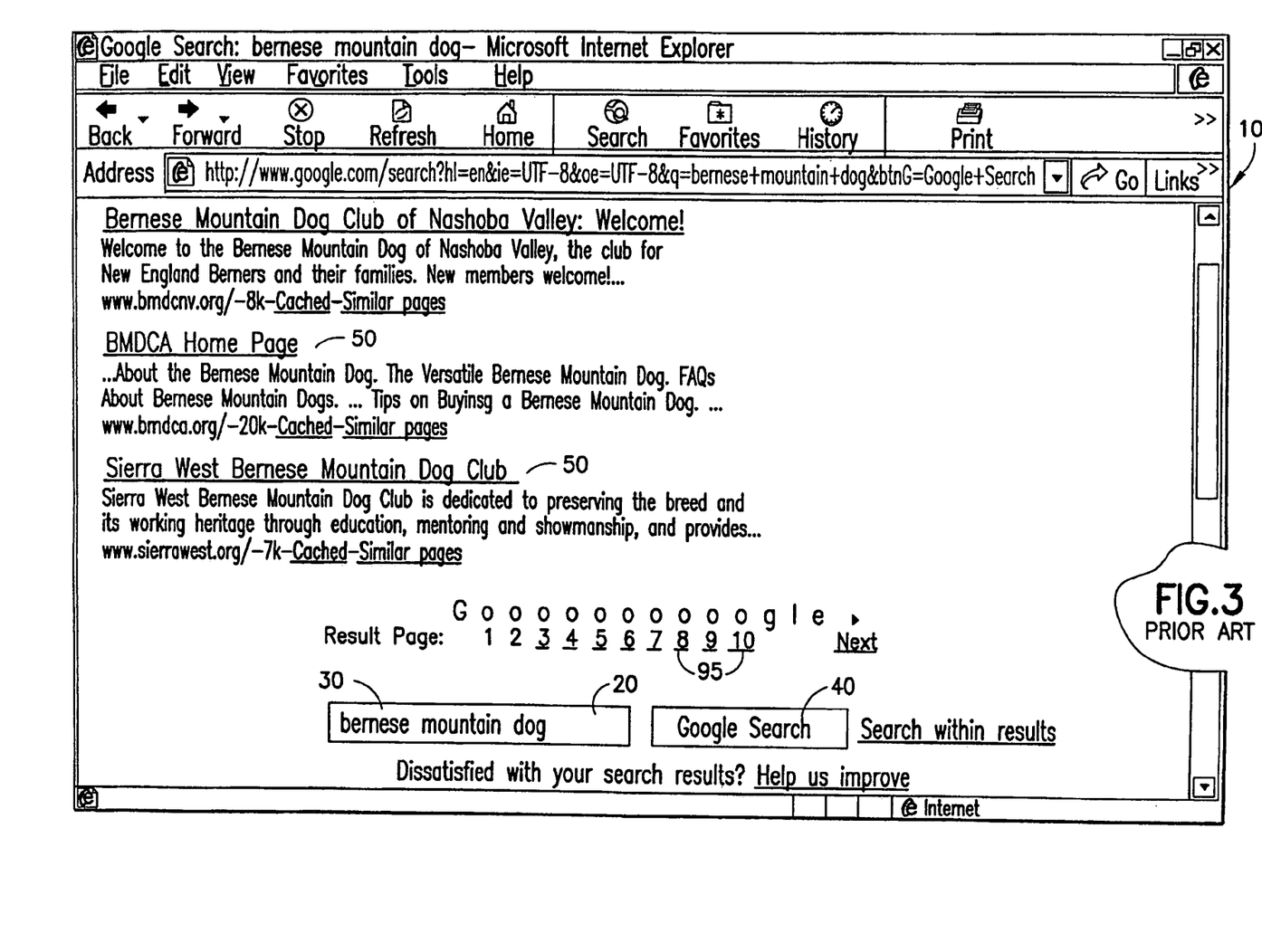
FIG. 3 is a screen shot of a continuation of FIG. 1.

Referring now to FIG. 3, there is shown a continuation of search result screen 10 of FIG. 1 containing the plurality of search results 50. In order to facilitate searching by the user, search field 20 and search button 40 are duplicated at both the top and bottom of search result screen 10. In addition, a plurality of additional results page links 95 are displayed to retrieve additional search results 50. There are no search categories 60 present at the end of page 10. Similarly, there is no association between the search term 30 contained in the search field 20 and the search category 60 selected by the user.

Figure 4:
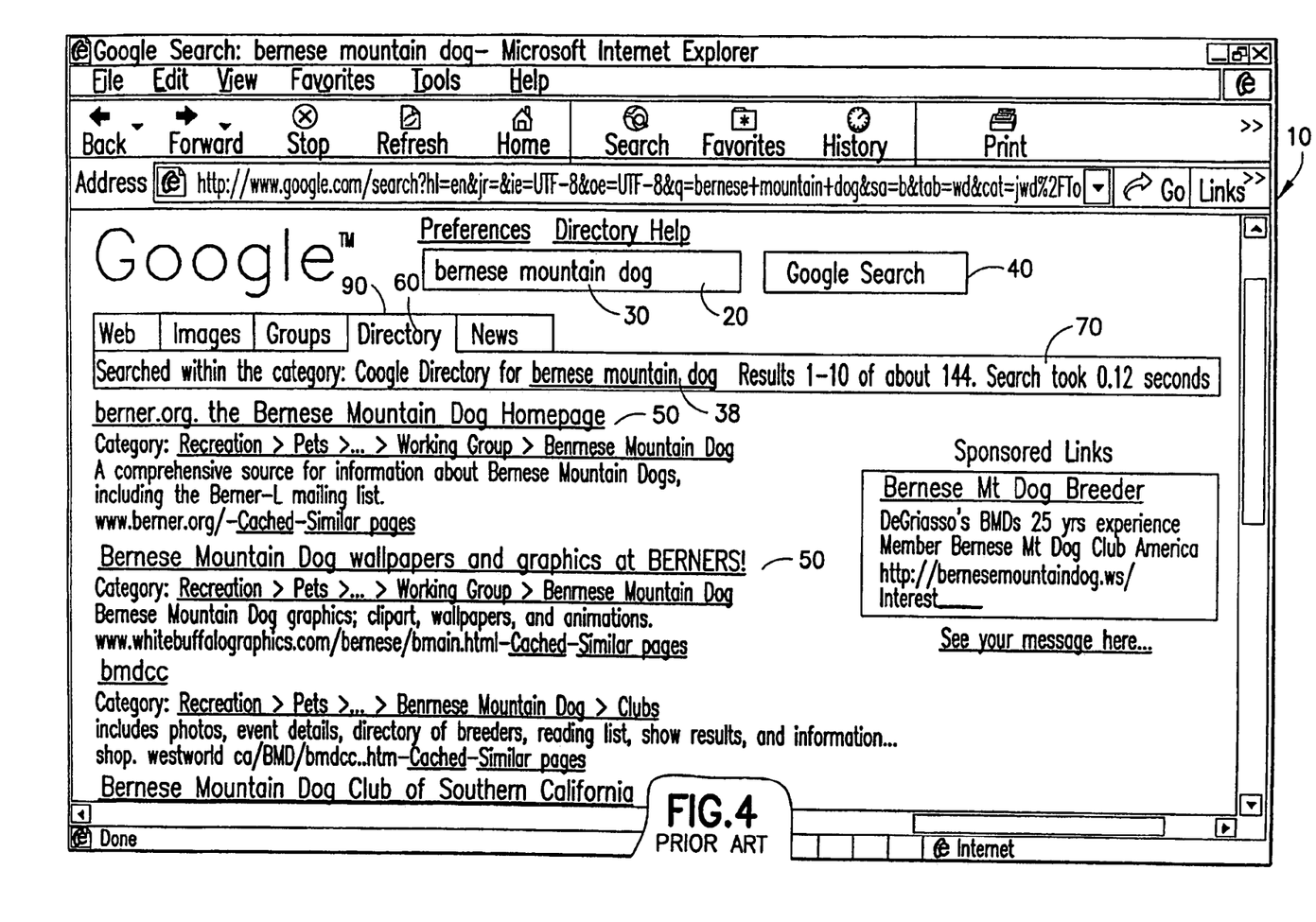
FIG. 4 is a screen shot of the search results screen according to FIG. 1 where the "directory" tab is selected.

Referring to FIG. 4, there is shown search results screen 10 of FIG. 1 corresponding to selected tab 90. In this instance, selected tab 90 refers to the search category "directory" and the corresponding search results 50.

Figure 5:
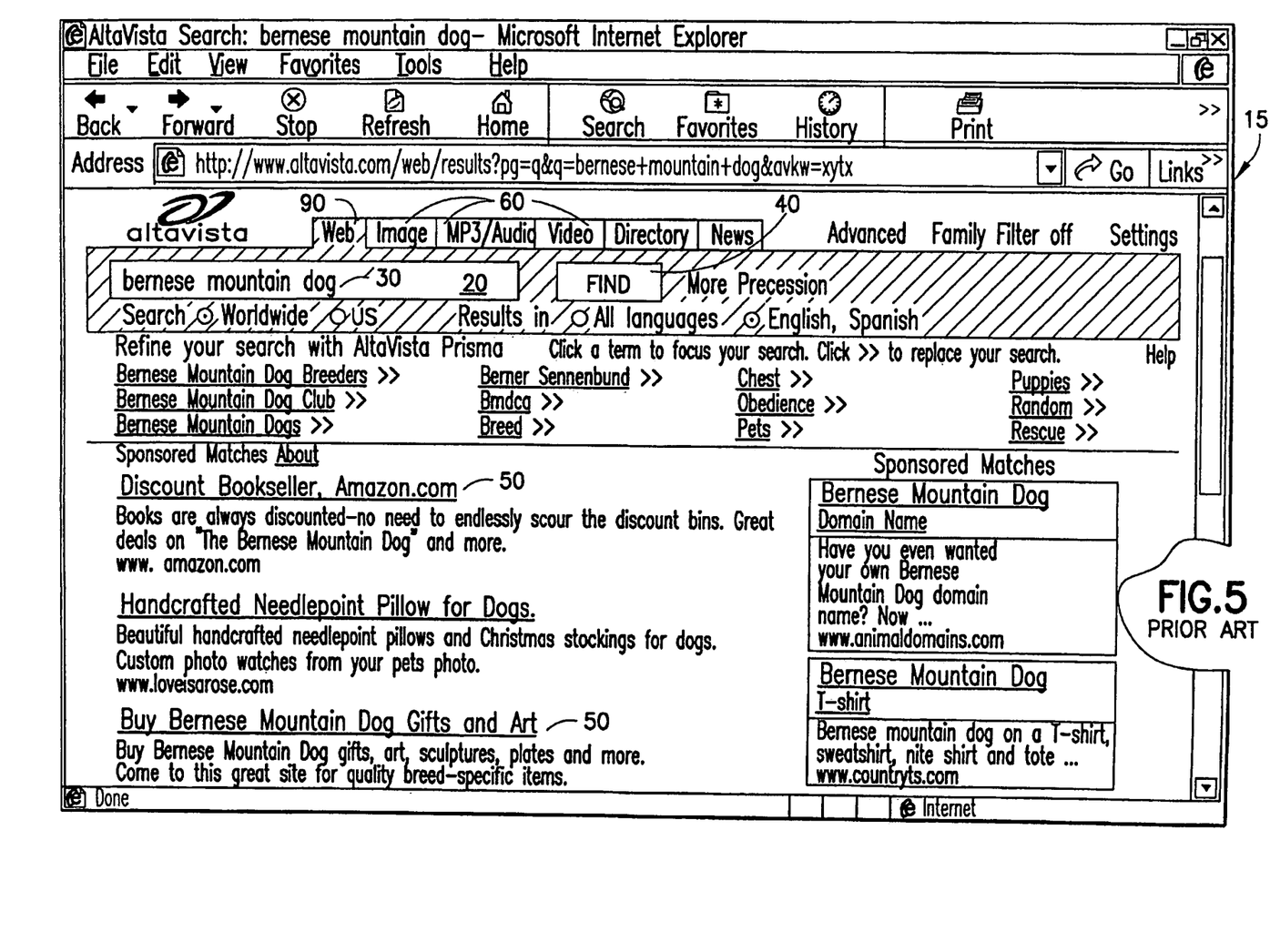
FIG. 5 is a screen shot of an additional search results screen, according to the prior art.
Figure 6:
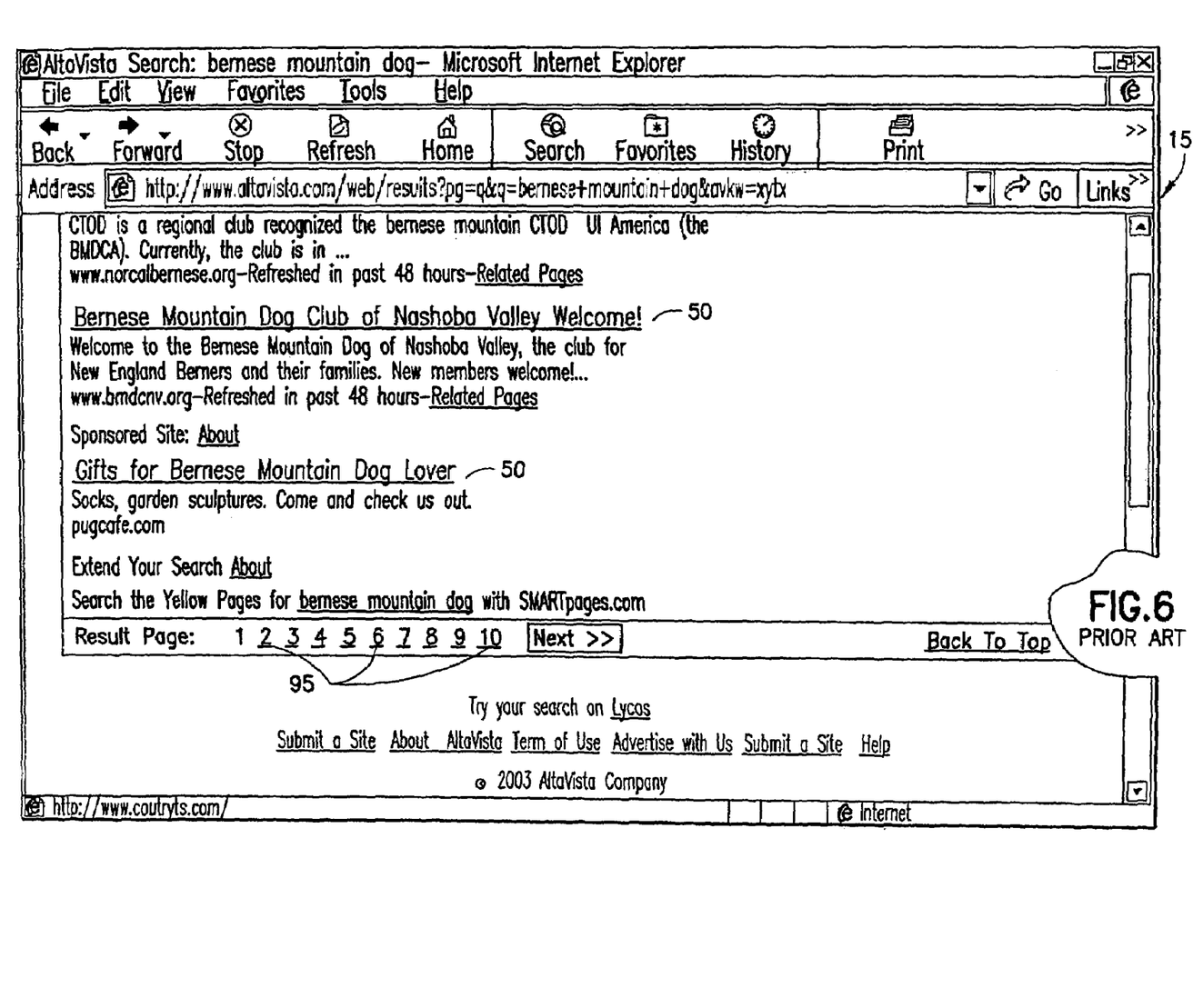
FIG. 6 is a screen shot of a continuation of FIG. 5.

Referring to FIGS. 5 and 6, there is shown an alternate search results screen 15 and a continuation of screen 15 of FIG. 5, respectively. Screen 15 contains search field 20, search term 30, search button 40, and search results 50 with various search categories 60. In addition, selected tab 90 is highlighted to indicate that a particular search category 60 is selected. FIG. 6 is a continuation of screen 15 of FIG. 5 and depicts the remainder of search results 50. In addition, screen 15 contains additional results page links 95 located on the bottom of screen 15. There are no search categories 60 present at the end of page 15. Similarly, there is no visual association between the search term 30 contained in the search field 20 and the search category 60. Likewise, the search field separates the search categories 60 from the search results 50.

While the current search engines facilitate searching the vast amount of information present on the internet, users tend to be overwhelmed with the sheer volume of textual information contained on the search results screen. Accordingly, users tend to disregard most of the textual information and instead focus their attention on visual information and non-textual icons. While the current search engines provide a textual reference to the search criteria entered by the user for each of the category of results or change the color of the selected tab, such information tends to be overlooked by the user. In addition, there is no visual association between the search term 30 contained in the search field 20 and the search category 60 located at the beginning or at the end of each results screen 10 and 15. Accordingly, there remains a need in the art for a system and method for visually and reliably associating a search region having a search term with a category of result.

SUMMARY OF THE INVENTION

The present invention provides a system and method for providing an improved graphical user interface for web search. According to an embodiment of the present invention, a connection indicator is provided to visually associate the search criteria contained in the search field with the category of searchable information from which the results of the search were obtained.

In an alternate embodiment, a connection indicator is provided to visually associate a search field having a search term with a search category at the end of each search page.

BRIEF DESCRIPTION OF THE DRAWINGS

These and other objects and features of embodiments of the present invention will become apparent from the following detailed description considered in connection with the accompanying drawings which are attached hereto and form a part hereof. It should be understood, however, that the drawings are designed for the purpose of illustration only and not as a definition of the limits of the invention.

In the drawings, wherein similar reference characters denote similar elements throughout the several views:

FIG. 11 is a screen shot of an exemplary home search page for entering search terms into search field;

DETAILED DESCRIPTION OF CERTAIN EMBODIMENTS

Figure 7:
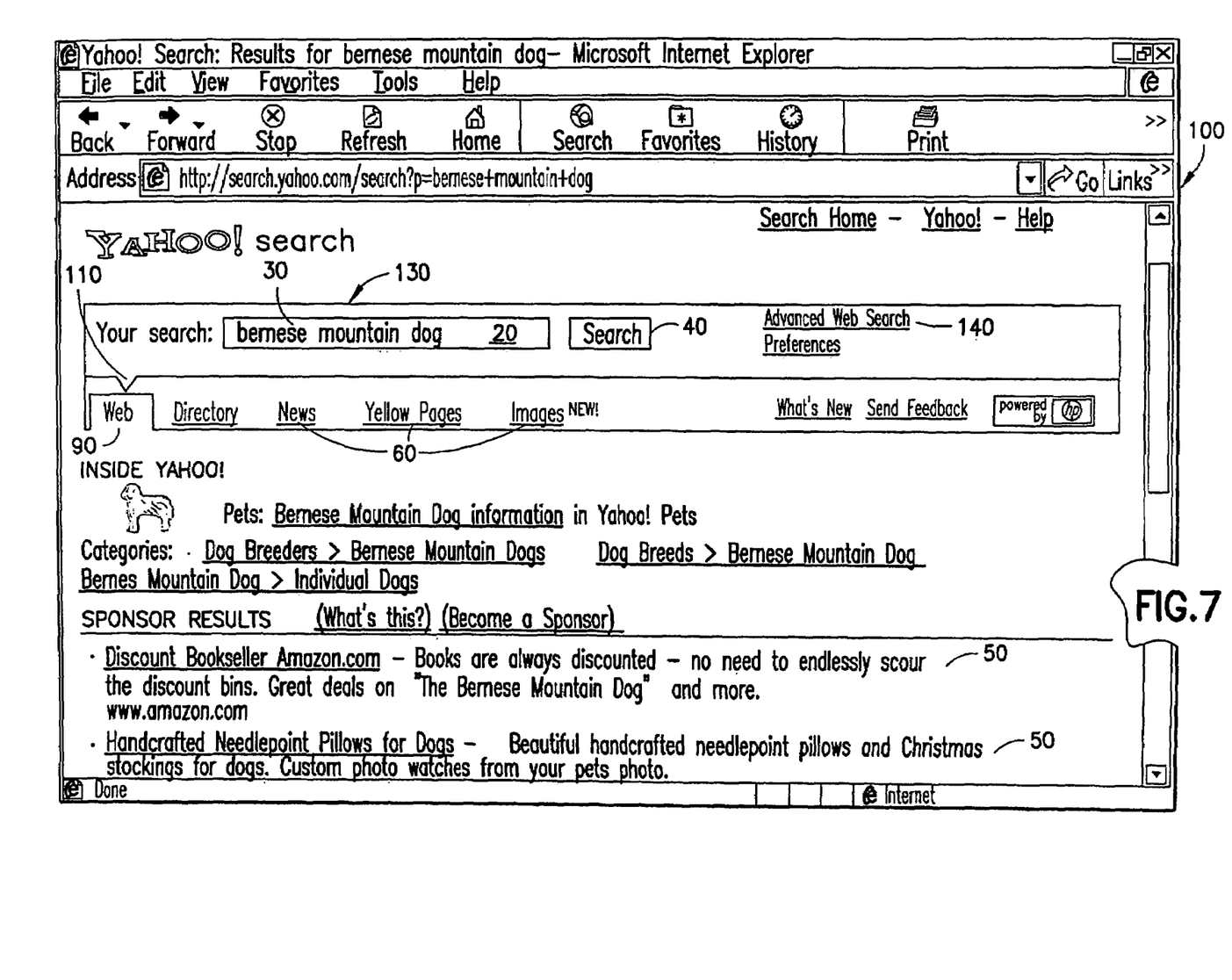
FIG. 7 is a screen shot of a retrieved results page embodying a preferred embodiment of the present invention.

Turning now to the drawings, FIG. 7 shows a screen shot of a GUI showing retrieved results page 100 embodying one embodiment of the present invention. In order to perform a search for information located on the Internet, a user enters search term 30 into search field 20 and presses search button 40. After a short period of time, the plurality of search results 50 appear as well as a presentation of indicia of a plurality of search categories 60. Search categories 60 may be represented by any indicia, for example, text labels, icons, and the like, that is associated with the search category. The initial search category with which the search is conducted, known as the default category, is generally searched first. The present invention provides a connection indicator that visually depicts, and establishes, a connection between a search region containing a search term 30 and the desired category of search represented by the indicia of the search category. In a preferred embodiment, the connection indicator is presented in the GUI 100 as a search pointer 110 having a first end and a second end that visually connects and associates search term 30 in search field 20 with a selected one 90 of search category 60. In an alternate embodiment, the connection indicator is presented in the GUI 100 as a search pointer 110 having a first end and a second end that visually connects and associates search term 30 in search field 20 with a selected one of an indicia of search category 60.

In a preferred embodiment, the first end of search pointer 110 is integrally formed with a search control region 130. Search control region 130 preferably comprises search field 20 and search button 40. In addition, region 130 may contain a plurality of search navigation links 140. The second end of search pointer 110 is proximately associated with the appropriate search category which, in the preferred embodiment, is contained within selected tab 90. Selected tab 90 contains a text description of the search category 60 of searchable information from which search results 50 are obtained. A results region contains a plurality of search results and indicia of a plurality of search categories and is located adjacent to search region 130. By way of example, FIG. 7 describes the situation where the selected category, represented by a link displayed as a style of index tab 90, contains a search category 60 bearing the label "Web.", meaning the search term was searched in the Web search category. This tab may be the default tab after the user presses search button 40, or may have been purposefully selected by selecting the desired category on a previously displayed web page (not shown). Tab 90 reflects that search results 50 are for this search category 60. Through the use of pointer 110, the user is quickly and easily in a visual, non-textual way, made cognitive of the linkage between the search category 60 of selected tab 90 and the search term 30 contained in search field 20. In fact, in performing user preference studies, the assignee of the present invention noted significantly improved recognition of the association between search terms and search categories when employing the present invention during the testing and development, as opposed to prior art methods which did not incorporate the present invention.

While FIG. 7 denotes search pointer 110 as a protruding extension from search control region 130 in the shape of a shadowed triangle where the first end is wider than the second end, it is understood that the search pointer may be any shape or size including, but not limited to, an arrow or even a straight line, or any shape or icon, provided it performs the function of visually, non-textually associating the search term 30 located in the search field 20 with the search category 60 contained in selected tab 90.

Figure 8:
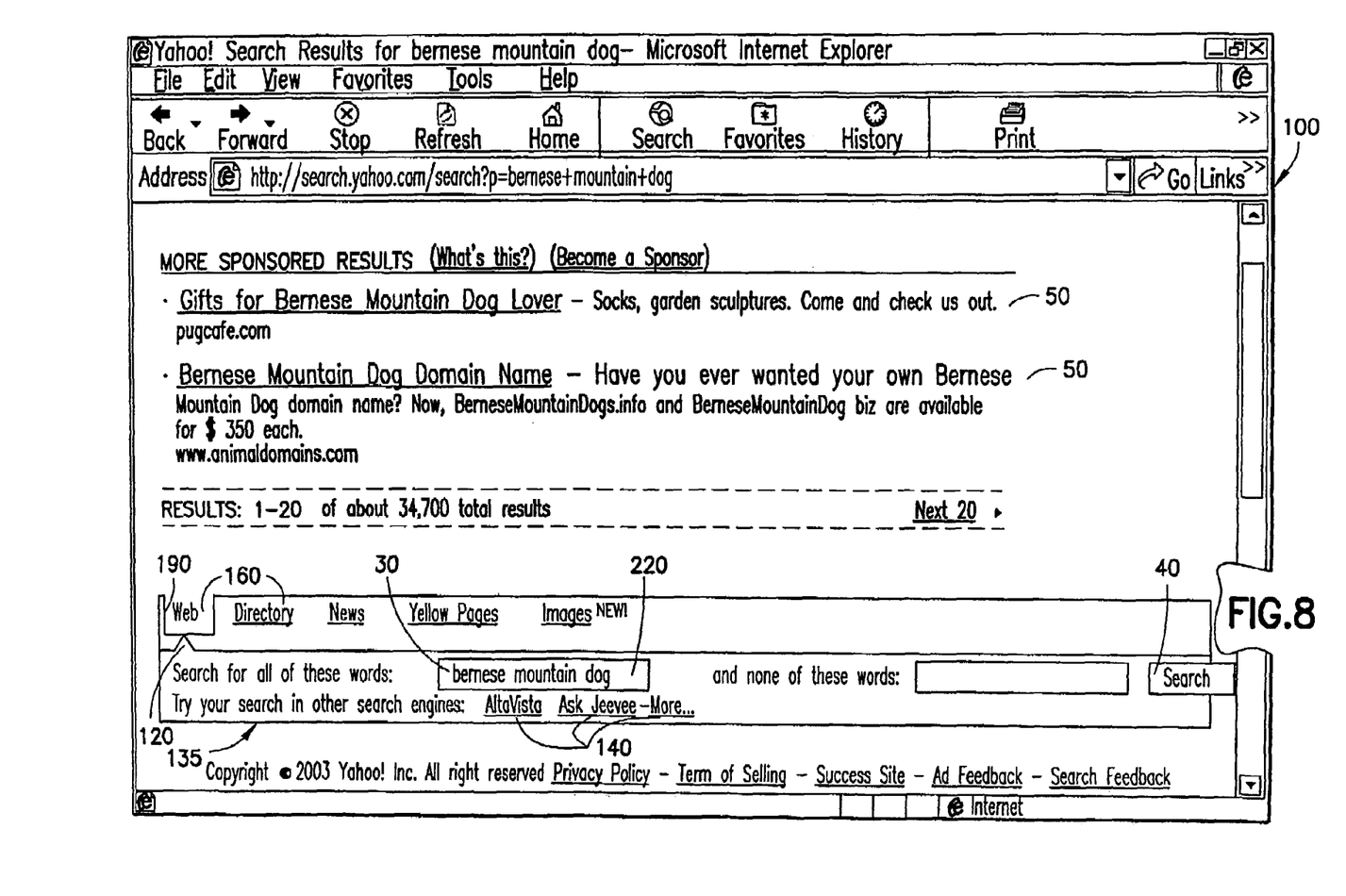
FIG. 8 is a continuation of retrieved results page according to FIG. 7.

Referring now to FIG. 8, there is shown a continuation of retrieved results page 100 of FIG. 7. In order to facilitate searching for documents and for accessing the retrieved search results, a plurality of alternate search categories 160 are displayed at the end of the retrieved results page 100. In addition, an alternate selected tab 190 containing the alternate search category 160 selected by a user is associated with the search results 50.

In an additional embodiment of the present invention, an alternate connection indicator 120 visually associates search term 30 in an alternate search field 220 with the alternate search category 160. The alternate connection indicator 120 may be a search pointer having a first end and a second end visually associates search term 30 in alternate search field 220 with the alternate search category 160. The first end of alternate search pointer 120 is integrally formed with an alternate search control region 135. Region 135 also comprises search field 220 and search button 40. In addition, region 135 may contain search navigation links 140. The second end of pointer 120 is associated with alternate selected tab 190 containing search category 60 located within selected tab 190. By providing the visual connection indicator of the present invention at both the top and bottom of the page, the user need not navigate back to the top of the page to determine the category of search selected. In addition, the alternate search category 160 can be selected to further conduct or narrow the search. If, for example, the user were to desire news stories about the selected search term, the user could select, or click on the "news" search category 60 at the top of the page or the "news" alternate search category 160 at the bottom of the page.

Figure 9:
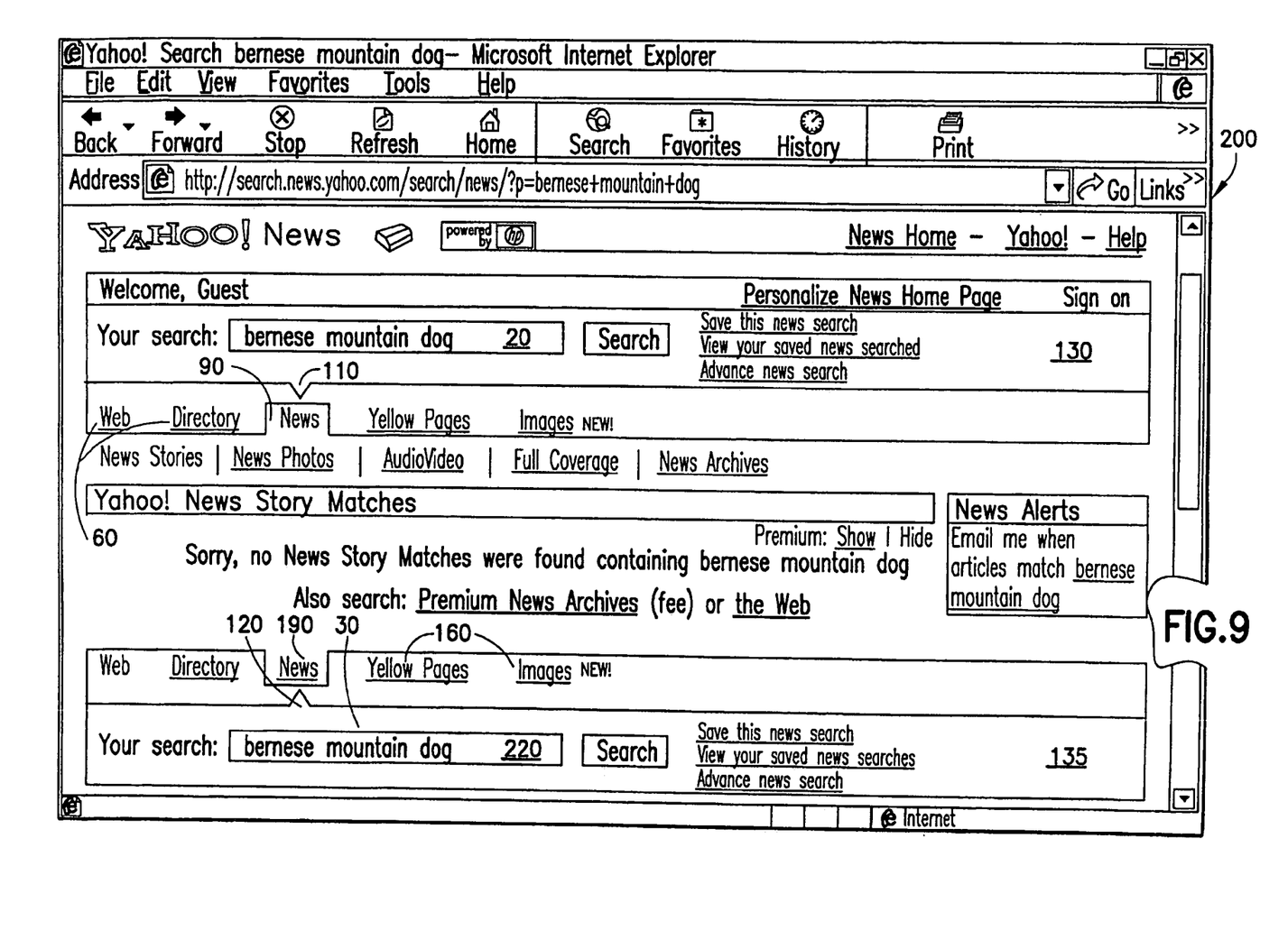
FIG. 9 is a screen shot of a news retrieved results page according to FIG. 7 where the "news" tab is selected.

FIG. 9 is a screen shot of a retrieved results page 200 according to FIG. 7 where the "news" category is the search category selected by the user to perform a further search, as indicated by selected tab 90. Whenever the user selects a particular search category 60, that category becomes highlighted within the selected tab 90 and the present invention then relocates the pointer 110 and/or 120 to be located proximate to the selected tab 90 or tab 190, respectively, indicating the connection between the search term in the search field with the newly selected search category.

While current search engines may change the color of selected tab 90, the present invention associates the search category 60 located within selected tab 90 with the search control region 130 by moving search pointer 110 such that a first end is associated with search control region 130 and the search term situated therein and the second end is associated with the search category 60 contained within selected tab 90. This visual link between the search term 30 contained in search field 20 and the search category 60 contained within selected tab 90 not only reduces the amount of textual data on the screen, but it also rapidly and intuitively draws the users attention to the link between what was searched and the category of search from which the results were obtained and currently displayed on the screen.

In FIG. 9, the selected tab 90 contains the search category 60 bearing the label "news". When the user selected "news", selected tab 90 shifts to the "news" category and search pointer 110 shifts from its previous location "web" and associates search term 30 contained in search field 20 with the search category 60 contained within selected tab 90. That is, the first end of pointer 110 is connected to search control region 130 and the second end of pointer 110 is connected to the selected search category 60 contained in selected tab 90. While the exemplary GUI 100 of the preferred embodiment depicts the link or text description of search category 60 as being contained in an index tab type indicia, tab 90, search category 60 may be depicted in any way desired as a matter of application specific design choice.

The method for providing an improved graphical user interface for web search is performed by first obtaining a search term, then performing a search limited to that search term and then obtaining a plurality of results pertaining to the search term. Once the results are obtained, a plurality of search categories are displayed and the search term is visually associated with one of the plurality of search categories using a connection indicator. The connection indicator may be a pointer or any other indicia that visually and non-textually links the search category with the search term. In a preferred embodiment, the pointer has a first end and a second end where the first end is visually associated with the search term and the second end is visually associated with one of the search categories.

Note that in FIG. 9, both search pointer 110 and alternate search pointer 120 are displayed on the same screen as there are no search results 50 pertaining to the "news" search category 60.

Figure 10:
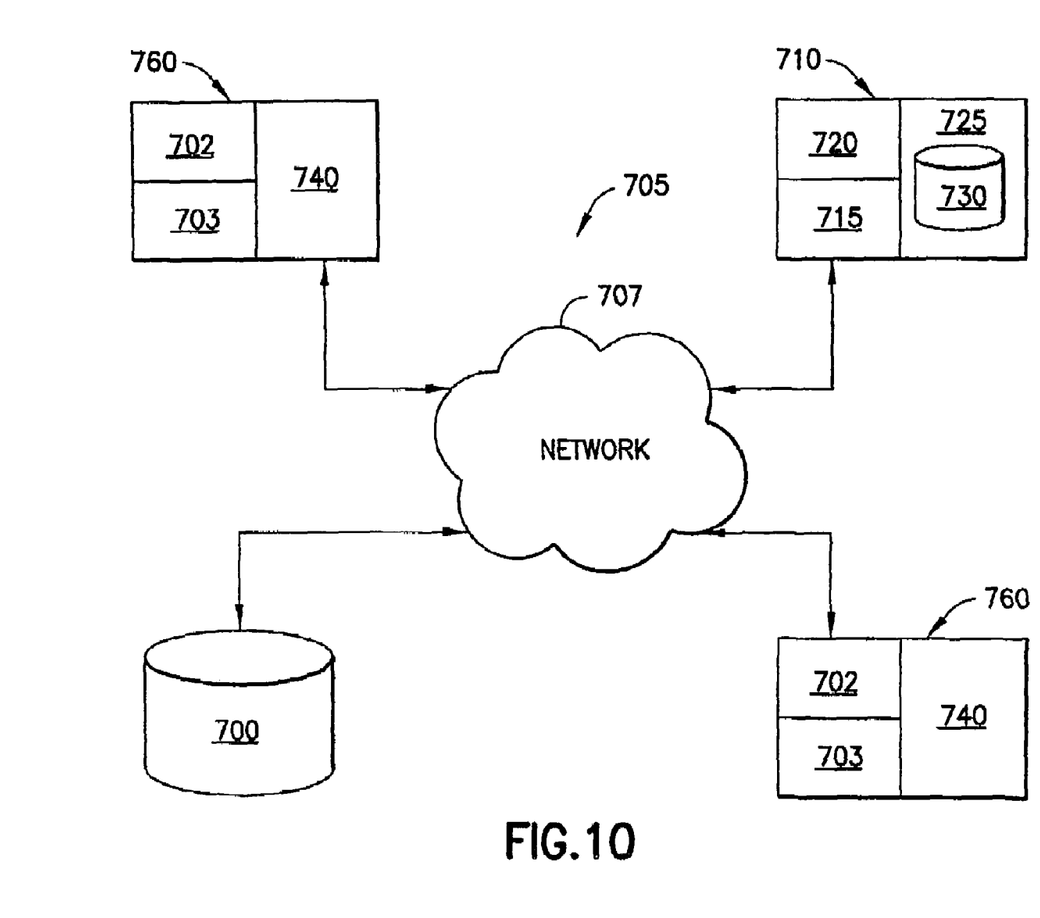
FIG. 10 is a diagram of an exemplary system for implementing a preferred embodiment of the present invention.

Referring to FIG. 10, there is shown a diagram of an exemplary system 705 for implementing the present invention. System 705 is comprised of a network 707, a query server 710 connected to network 707, a database 700 connected to network 707 and a plurality of query terminals 760 connected to the network. Query server 710 is comprised of a microprocessor 715, a memory device 720, a storage device 725 and an internal database 730 located on storage device 725 wherein each device is interconnected via a system bus (not shown). Each plurality of query terminals 760 is comprised of a microprocessor 703, a memory device 702 and an I/O device 740 wherein each device is interconnected via a system bus (not shown).

In a preferred embodiment, the pointer is relocated using hypertext markup language (HTML) and GUI coding techniques. When a user clicks on or selects a search category 60, that information is passed back to the system 705, either at the user's computer 760 or under the control of the search service provider or some combination thereof, to adjust the GUI interface in accordance with the selected link to relocate, or initially locate, the connection indicator 110 or 120 proximate the selected search category 90 and the search term 30 within search field 20. Of course it will be recognized that any software programming techniques now know or yet to become known can be used to carry out the present invention.

In practice, query server 710 could be any computer or device connected to network 707 that is capable of storing a database or other file system, accessing that database or other file system and determining whether any portion of a search term is contained therein. Network 707 may be the Internet or any other network of devices. In addition, network 707 may be an internal intranet. Terminals 760 could also be any computer or device capable of connecting to network 707, for example, a personal computer, a handheld device, a server, or any combination thereof. The connection to the network could be through any means known including, but not limited to, broadband access, DSL, dial up modem or a wireless connection such as a Wi-Fi connection or a Bluetooth transceiver.

Figure 12:
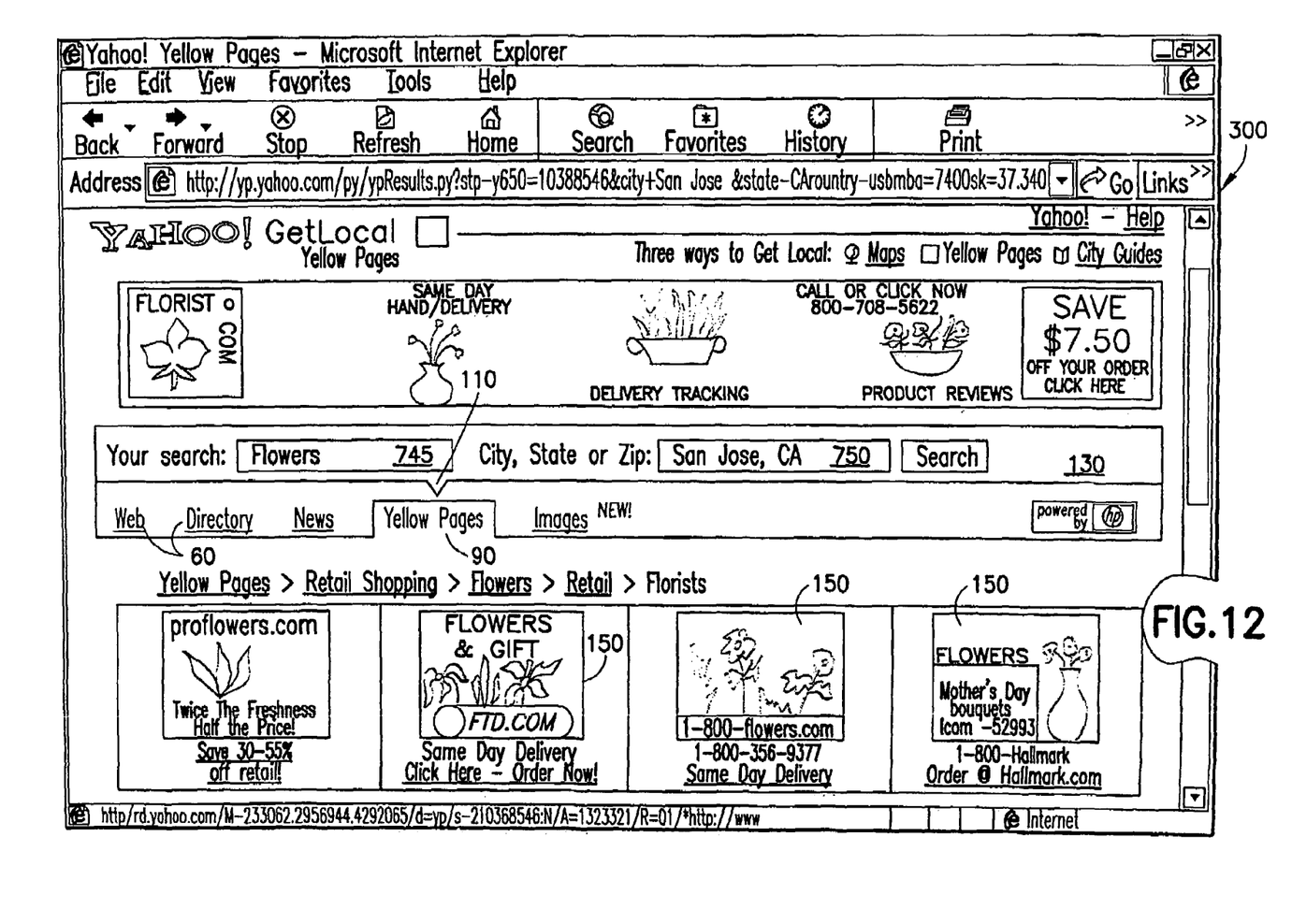
FIG. 12 is a screen shot of an exemplary phone directory retrieved results page according to one embodiment of the present invention.

Turning to FIGS. 11 and 12, there is shown a screen shot of a home search page 105 for entering search terms 30 into search field 20 and a corresponding phone directory retrieved results page 300. In this example, the user is looking for flowers in San Jose, Calif. Once the user enter the desired search term and presses the search button 40, a search is performed and the phone directory search results 150, if any, are displayed on phone directory retrieved results page 300. The results 150 are visually linked to search category 60 of selected tab 90 using the connection indicator, for example pointer 110 or 120. FIG. 12 is representative of the instance where selected tab 90 bears a label "yellow pages" indicating that a phone directory search was performed. In this instance, the phone directory search automatically directs the user from home search page 105 directly to phone directory retrieved results page 300 of FIG. 12.

In an additional embodiment of the present invention, the user may enter the search terms, i.e. flowers in San Jose, Calif., depress search button 40 and be directed to a default search category such as "web". If the user wanted to select the phone directory category for this search term, the user would select, or click on, the phone directory search category "Yellow Pages". At this point, a search is performed to obtain search results and then phone directory search category is visually associated with the search terms. Accordingly, the search may be performed from the home search page 105 and have the search terms linked directly to the phone directory search category or performed from a default search category page by selecting the phone directory search category, for example "Yellow Pages".

Figure 13:
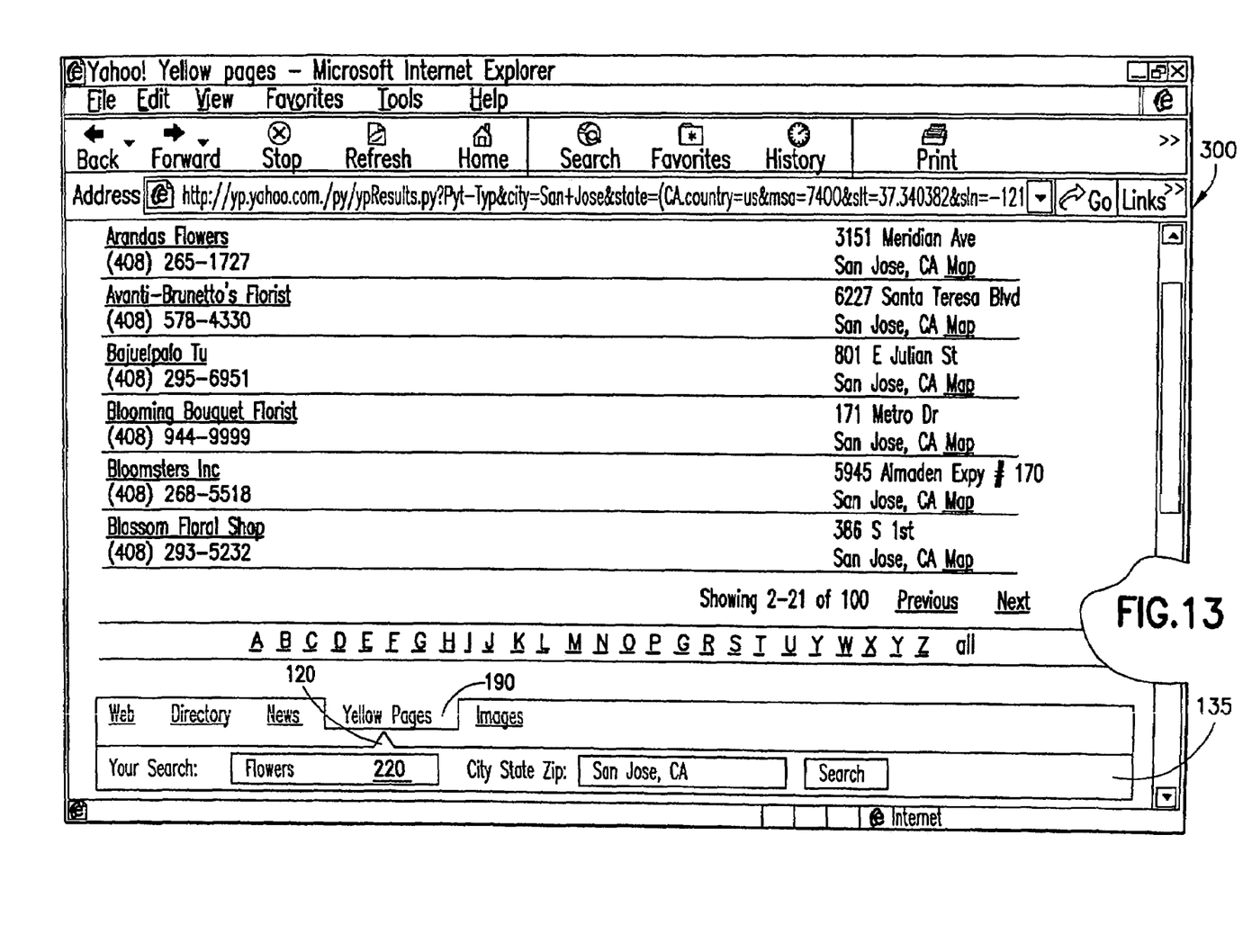
FIG. 13 is a continuation of results page of FIG. 12.

Referring to FIG. 13, there is shown a continuation of phone directory retrieved results page 300 of FIG. 12. As an additional service to the user, alternate search control region 135 is located at the end of results page 300. Alternate pointer 120 is physically connected to region 135 and to alternate search category 160 contained in alternate selected tab 190. By providing the visual connector of the present invention at both the top and bottom of the page, the user need not navigate back to the top of the page to determine the category of search selected, and also which search category can be selected to further conduct or narrow the search.

While several embodiments of the present invention have been shown and described, it is to be understood that many changes and modifications may be made thereto without departing from the spirit and scope of the invention as defined in the appended claims.

The invention claimed is:

1. A method for providing a graphical user interface for search comprising:
   obtaining a search term;
   performing a search for said search term;
   obtaining a plurality of results pertaining to said search term;
   displaying indicia of a plurality of search categories; and
   visually associating a search region containing said search term with one of said indicia of search categories using a connection indicator.

2. The method according to claim 1, wherein said connection indicator is a pointer having a first end and a second end, said first end being visually associated with said search term and said second end being visually associated with one of said indicia of search categories.

3. The method according to claim 2 wherein said indicia of search category is labeled "Yellow Pages".

4. The method according to claim 2 wherein said indicia of search category is labeled "Web".

5. The method according to claim 1 wherein visually associating said search region further comprises visually associating said search region with a default indicia of a search category.

6. The method according to claim 2 wherein said default search category indicia is labeled "Yellow Pages".

7. The method according to claim 2 wherein said default search category indicia is labeled "Web".

8. The method according to claim 1 further comprising displaying a plurality of alternate search category indicia and visually associating said search region with one of said plurality of alternate search category indicia using an alternate connection indicator.

9. The method according to claim 8 wherein said alternate connection indicator is disposed at the bottom of a web page.

10. The method according to claim 1 further comprising:
    selecting one of said search category indicia; and
    visually associating said search region with said selected search category indicia using said connection indicator.

11. The method according to claim 1 further comprising:
    displaying said search terms and a search button in the search region wherein said search region is located adjacent to said indicia of the plurality of search categories.

12. The method according to claim 1 further comprising:
    selecting one of said plurality of search categories;
    performing a new search for said search term corresponding to said selected search category;
    obtaining a new plurality of results pertaining to said search term in response to said new search;
    displaying indicia of a plurality of search categories; and
    visually associating the search region containing said search term with the indicia of said selected search category using a connection indicator.

13. A system for providing a graphical user interface for search comprising:
    a search region which displays a user's search criteria;
    a result region which displays search results, said result region comprising indicia of a plurality of search categories; and
    a connection indicator establishing a visual connection between said search region and a selected one of said search category indicia so as to enable a user to make a cognitive connection indicating that the user's search criteria was found in the particular search category indicated by said connection indicator.

14. The system according to claim 13 wherein said connection indicator is a pointer having a first end and a second end, said first end is wider than the second end and visually associated with the search region while said second end is visually associated with said selected one of search category indicia.

15. The system according to claim 13 wherein said connection indicator establishes a visual connection between said search region and a default search category indicia so as to enable a user to make a cognitive connection indicating that the user's search criteria was found in the particular default search category indicated by said connection indicator.

16. The system according to claim 15 wherein said default search category indicia is labeled "Web".

17. The system according to claim 15 wherein said default search category indicia is labeled "News".

18. The system according to claim 15 wherein said default search category indicia is labeled "Yellow Pages".

19. The system according to claim 13, further comprising:
    an alternate search region which displays a user s search criteria;
    an alternate result region which displays search results, said alternate result region comprising indicia of a plurality of alternate search categories, said alternate search region and said alternate result region being disposed at the bottom of a web page; and
    an alternate connection indicator establishing a visual connection between said alternate search region and said selected one of said alternate search category indicia so as to enable a user to make a cognitive connection indicating that the user's search criteria was found in the particular alternate search category indicated by said alternate connection indicator.

20. The system according to claim 19 wherein said alternate connection indicator is a pointer having a first end and a second end, said first end is wider than said second end and visually associated with said alternate search region while said second end is visually associated with said selected one of said alternate search category indicia.

21. The system according to claim 19 wherein said alternate connection indicator establishes a visual connection between said alternate search region and a default alternate search category indicia so as to enable a user to make a cognitive connection indicating that the user's search criteria was found in the particular default alternate search category indicated by said alternate connection indicator.

22. The system according to claim 13 wherein said search region further comprises a search button.

23. The system according to claim 22 wherein said search region is disposed adjacent to said result region.

24. A system comprising:
    at least one processor to:
      define a graphical user interface comprising a search region containing a user's search criteria, and a result region comprising indicia of a plurality of search categories; and define, via said graphical user interface, a visible connection indicator establishing a visual connection between said search region and a selected one of search category indicia so as to enable a user to make a cognitive connection indicating that the user's search criteria was found in the particular search category indicated by said connection indicator.

25. A graphical user interface for search, comprising:
a search region which displays an area for containing user search criteria;
a result region which displays search results, said result region comprising plural indicia representing a plurality of search categories within which user search criteria may be searched, at least one of said plurality of said search category indicia selected from a group of search category indicia consisting of a web category indicia and a yellow pages category indicia; and
a connection indicator establishing a visual connection between said search region and a selected one of said search category indicia that indicates the search category within which a search for said search criteria is performed, said connection indicator indicating that a search for said user search criteria has been performed in the search category indicated by said connection indicator, said connection indicator comprising a pointer that points from a region proximate said search region to a region proximate said selected one search category indicia.

26. The user interface of claim 25 wherein said search region comprises a search term text entry area.

27. The user interface of claim 26 wherein the each of the plural search category indicia comprises a text region and a surrounding graphics region, the two aforementioned regions so configured as to resemble a labeled index tab on a file folder.

28. The user interface of claim 26 wherein the connection indicator resembles an arrowhead.

29. A method for providing a graphical user interface for search, the method comprising:
defining a graphical user interface to be displayed at a user computer, the graphical user interface comprising a search region containing an area for containing user search criteria and a result region comprising plural indicia representing a plurality of search categories within which user search criteria may be searched, at least one of said plurality of said search category indicia selected from a group of search category indicia consisting of a web category indicia and a yellow pages category indicia; and
defining, in the graphical user interface, a connection indicator establishing a visual connection between said search region and a selected one of said search category indicia that indicates the search category within which a search for said search criteria is performed, said connection indicator indicating that a search for said user search criteria has been performed in the search category indicated by said connection indicator, said connection indicator comprising a pointer that points from a region proximate said search region to a region proximate said selected one search category indicia.

30. A computer-readable medium in which computer-executable code is stored, the code, when executed, providing a graphical user interface for search, comprising:
defining a graphical user interface to be displayed at a user computer, the graphical user interface comprising a search region containing an area for containing user search criteria and a result region comprising plural indicia representing a plurality of search categories within which user search criteria may be searched, at least one of said plurality of said search category indicia selected from a group of search category indicia consisting of a web category indicia and a yellow pages category indicia; and
defining, in the graphical user interface, a connection indicator establishing a visual connection between said search region and a selected one of said search category indicia that indicates the search category within which a search for said search criteria is performed, said connection indicator indicating that a search for said user search criteria has been performed in the search category indicated by said connection indicator, said connection indicator comprising a pointer that points from a region proximate said search region to a region proximate said selected one search category indicia.

* * * * *